(12) United States Patent
Tanaka et al.

(10) Patent No.: US 11,458,460 B2
(45) Date of Patent: Oct. 4, 2022

(54) EXHAUST GAS PURIFICATION CATALYST

(71) Applicant: Mitsui Mining & Smelting Co., Ltd., Tokyo (JP)

(72) Inventors: Hiroki Tanaka, Saitama (JP); Yuki Nagao, Saitama (JP); Tokuya Watanabe, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 213 days.

(21) Appl. No.: 16/968,896

(22) PCT Filed: Aug. 23, 2018

(86) PCT No.: PCT/JP2018/031210
§ 371 (c)(1),
(2) Date: Aug. 11, 2020

(87) PCT Pub. No.: WO2019/187198
PCT Pub. Date: Oct. 3, 2019

(65) Prior Publication Data
US 2022/0176353 A1 Jun. 9, 2022

(30) Foreign Application Priority Data
Mar. 28, 2018 (JP) .............................. JP2018-063118

(51) Int. Cl.
*F01N 3/28* (2006.01)
*B01J 23/46* (2006.01)
(Continued)

(52) U.S. Cl.
CPC ........ *B01J 23/464* (2013.01); *B01D 53/9472* (2013.01); *B01J 23/44* (2013.01);
(Continued)

(58) Field of Classification Search
CPC ...... B01J 23/464; B01J 23/44; B01J 35/0006; B01J 35/0073; B01D 53/9472
(Continued)

(56) References Cited

U.S. PATENT DOCUMENTS 7,816,300 B2 10/2010 Takeuchi et al.
2001/0026838 A1* 10/2001 Dettling .............. C04B 41/5105
427/430.1
(Continued)

FOREIGN PATENT DOCUMENTS

JP 2009-50789 A 3/2009
JP 2017-104825 A 6/2017
(Continued)

OTHER PUBLICATIONS

International Search Report (ISR) dated Oct. 23, 2018 filed in PCT/JP2018/031210.

*Primary Examiner* — Tom P Duong
(74) *Attorney, Agent, or Firm* — Rankin, Hill & Clark LLP

(57) ABSTRACT

An exhaust gas purifying catalyst (10) according to the present invention is an exhaust gas purifying catalyst including the first catalyst layer (12). The first catalyst layer (12) includes the first section (14) and the second section (15) in the exhaust gas flow direction. The first section (14) is located on the upstream side in the exhaust gas flow direction relative to the second section (15). A catalyst layer (16) contains a catalytically active component including a specific element. The concentration of the specific element in the catalyst layer (12) is higher in the first section (14) than in the second section (15), in terms of mass per unit volume. When the first section is divided in half along the thickness direction of the first catalyst layer (12), the ratio of a1 to a2, a1/a2, is 1.1 or more, where a1 represents the mass of the specific element that is present on the surface side of the
(Continued)

catalyst layer (12) and a2 represents the mass of the specific element that is present on the other side than the surface side of the catalyst layer.

7 Claims, 5 Drawing Sheets

(51) Int. Cl.
 B01J 35/00 (2006.01)
 B01J 23/44 (2006.01)
 B01D 53/94 (2006.01)
(52) U.S. Cl.
 CPC ....... B01J 35/0006 (2013.01); B01J 35/0073 (2013.01); B01D 2255/1023 (2013.01); B01D 2255/1025 (2013.01); B01D 2255/9032 (2013.01); F01N 3/2803 (2013.01); F01N 2370/04 (2013.01)
(58) Field of Classification Search
 CPC .... B01D 2255/1023; B01D 2255/1025; B01D 2255/9032; F01N 3/2803; F01N 2370/04
 USPC ....................................................... 422/180
 See application file for complete search history.

(56) References Cited

U.S. PATENT DOCUMENTS

| | | | |
|---|---|---|---|
| 2004/0076565 A1* | 4/2004 | Gandhi | F01N 3/108 422/177 |
| 2006/0057046 A1* | 3/2006 | Punke | B01J 37/0248 422/177 |
| 2008/0038172 A1* | 2/2008 | Chen | B01J 37/0244 423/213.2 |
| 2008/0044329 A1* | 2/2008 | Chen | B01J 37/0244 423/213.2 |
| 2009/0209408 A1* | 8/2009 | Kitamura | B01J 37/0246 502/328 |
| 2009/0257933 A1* | 10/2009 | Chen | B01D 53/945 502/263 |
| 2014/0241964 A1 | 8/2014 | Bergeal et al. | |
| 2015/0254073 A1* | 9/2015 | Menard | G06F 8/71 717/122 |
| 2015/0352492 A1* | 12/2015 | Andersen | B01D 53/9436 502/65 |
| 2015/0352494 A1 | 12/2015 | Hatfield et al. | |
| 2015/0352531 A1 | 12/2015 | Hatfield et al. | |
| 2016/0136626 A1* | 5/2016 | Phillips | B01J 29/763 422/171 |
| 2017/0296968 A1 | 10/2017 | Yoshida et al. | |
| 2017/0297005 A1 | 10/2017 | Onoe et al. | |
| 2017/0298797 A1* | 10/2017 | Onoe | B01J 23/464 |
| 2018/0023444 A1 | 1/2018 | Saito et al. | |
| 2018/0080359 A1* | 3/2018 | Price | F01N 13/009 |
| 2018/0178198 A1* | 6/2018 | Deeba | B01D 53/945 |

FOREIGN PATENT DOCUMENTS

| | | |
|---|---|---|
| WO | 2016/039302 A1 | 3/2016 |
| WO | 2016/185386 A1 | 11/2016 |

* cited by examiner

Fig. 5

| | Amount of Pd Loaded [g/L] (per volume of applied portion) | | | | | Relationship between Regions A/B and First/Second Sections | | Pd Concentration | | | WLTC: THC Emission (Emission in Comparative Example: 1.00) | |
|---|---|---|---|---|---|---|---|---|---|---|---|---|
| | Region A (L 50%) | | Region B (L 50%) | | | First section | Second section | Gradient a3/b3 in flow direction | Gradient a1/a2 in first section | Gradient b1/b2 in second section | WLTC-L (when starting engine) | WLTC-H (when driving at high SV) |
| | Uniform loading | Surface enrichment | Uniform loading | Surface enrichment | | | | | | | | |
| Comp. Ex. 1 | 4 | | 4 | | | A + B | - | - | 1.07 | - | 1.000 | 1.000 |
| Comp. Ex. 2 | | 4 | | 4 | | A + B | - | - | 2.85 | - | 0.906 | 0.945 |
| Comp. Ex. 3 | 6 | | 2 | | | A | B | 3 | 1.02 | 1.01 | 0.863 | 1.221 |
| Comp. Ex. 4 | 8 | | 2 | | | A | B | ∞ | 1.09 | 1.00 | 0.775 | 1.754 |
| Ex. 1 | | 6 | 2 | | | A | B | 3 | 2.49 | 1.03 | 0.783 | 1.099 |
| Ex. 2 | 2 | 4 | 2 | | | A | B | 3 | 1.81 | 1.03 | 0.720 | 1.010 |
| Ex. 3 | 4 | 2 | 2 | | | A | B | 3 | 1.43 | 1.02 | 0.701 | 1.164 |

EXHAUST GAS PURIFICATION CATALYST

TECHNICAL FIELD

The present invention relates to an exhaust gas purifying catalyst.

BACKGROUND ART

Conventionally, exhaust gas purifying catalysts for purifying three components (i.e., carbon monoxide (CO), hydrocarbon (HC), and nitrogen oxide ($NO_x$)) discharged from internal combustion engines such as diesel engines and gasoline engines have been proposed. These three components are purified mainly using noble metals, and in view of utilizing the performance of the noble metals as much as possible, there has been proposed a catalyst having a catalyst layer divided into an upstream section and a downstream section, the upstream section and the downstream section having different catalyst compositions. For example, Patent Literature 1 discloses an exhaust gas purifying catalyst having a lower catalyst layer designed such that the noble metal concentration in the lower catalyst layer is different on the upstream side and the downstream side.

Patent Literature 2 discloses an exhaust gas purifying catalyst having a catalyst layer in which a noble metal is distributed in a non-uniform manner in the thickness direction of the catalyst layer.

CITATION LIST

Patent Literature

Patent Literature 1: US 2018023444A1
Patent Literature 2: US 2014241964A1

SUMMARY OF INVENTION

The technique in which a noble metal is concentrated on the upstream side of the catalyst layer in the exhaust gas flow direction as described in Patent Literature 1 enables enhancement of the exhaust gas purification performance at low temperatures, for example when starting the engine. However, the inventors of the present invention have found through their studies that the advantageous effect provided by such a technique is not sufficient, and that the technique is problematic in that the exhaust gas purification performance degrades when the space velocity is high, for example, when driving at high speeds.

On the other hand, a catalyst design based on the disclosure of Patent Literature 2 in which, for example, the noble metal concentration is higher on the surface side than on the substrate side delivers favorable exhaust gas purification performance when the space velocity is high, but does not deliver a sufficient exhaust gas purification performance when starting the engine.

Accordingly, there is a need for a catalyst configuration that can exhibit a sufficient exhaust gas purification rate with the use of a limited amount of noble metals both when starting the engine and when driving at high speeds.

The inventors of the present invention have conducted an in-depth study on the configuration of an exhaust gas purifying catalyst which can achieve a sufficient exhaust gas purification rate with limited increase in the amount of noble metals used both when starting the engine and when driving at high speeds.

As a result, surprisingly, the inventors have found that a catalyst that delivers high exhaust gas purification performance with a limited amount of noble metals used both when starting the engine and when driving at high speeds can be obtained by configuring the catalyst such that a catalyst layer is divided into two or more sections in the exhaust gas flow direction, an upstream section having a noble metal concentration higher than a downstream section, and that the amount of the noble metal is larger on the surface side than on the substrate side in the upstream section.

The present invention has been made based on the findings described above, and provides an exhaust gas purifying catalyst including a first catalyst layer including a first section and a second section in an exhaust gas flow direction, the first section being located on an upstream side in the exhaust gas flow direction relative to the second section, wherein the first catalyst layer contains a catalytically active component including a specific element, a concentration of the specific element in the first catalyst layer is higher in the first section than in the second section, in terms of mass per unit volume, and a ratio of a1 to a2, a1/a2, is 1.1 or more, where a1 represents a mass of the specific element that is present on a surface side of the first section of the first catalyst layer when the first section is divided in half along a thickness direction of the first catalyst layer, and a2 represents a mass of the specific element that is present on another side than the surface side of the first section of the first catalyst layer.

BRIEF DESCRIPTION OF DRAWINGS

FIG. 5 shows the results of Comparative Examples 1 to 4 and Examples 1 to 3 with schematic diagrams of the exhaust gas purifying catalysts produced in Comparative Examples 1 to 4 and Examples 1 to 3.

DESCRIPTION OF EMBODIMENTS

Hereinafter, the present invention will be described by way of preferred embodiments thereof, but the present invention is not limited to the embodiments given below.

Figure 1:
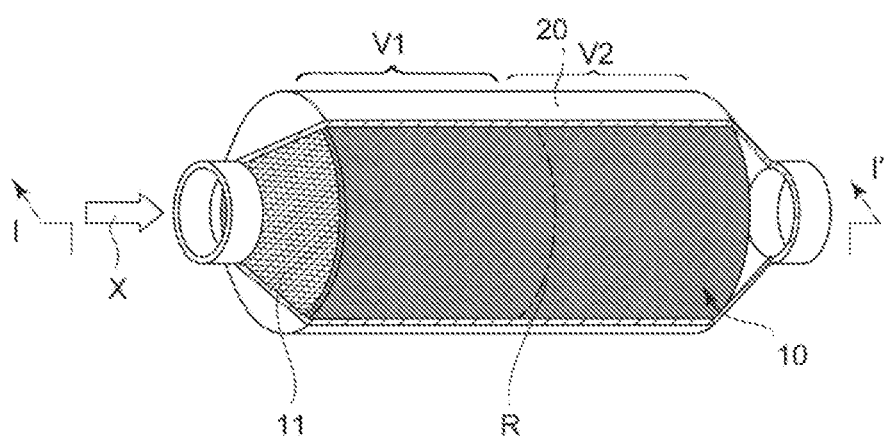
FIG. 1 is a schematic diagram showing an exhaust gas purifying catalyst according to an embodiment of the present invention in a state of being housed in a casing through which an exhaust gas flows.
Figure 2:
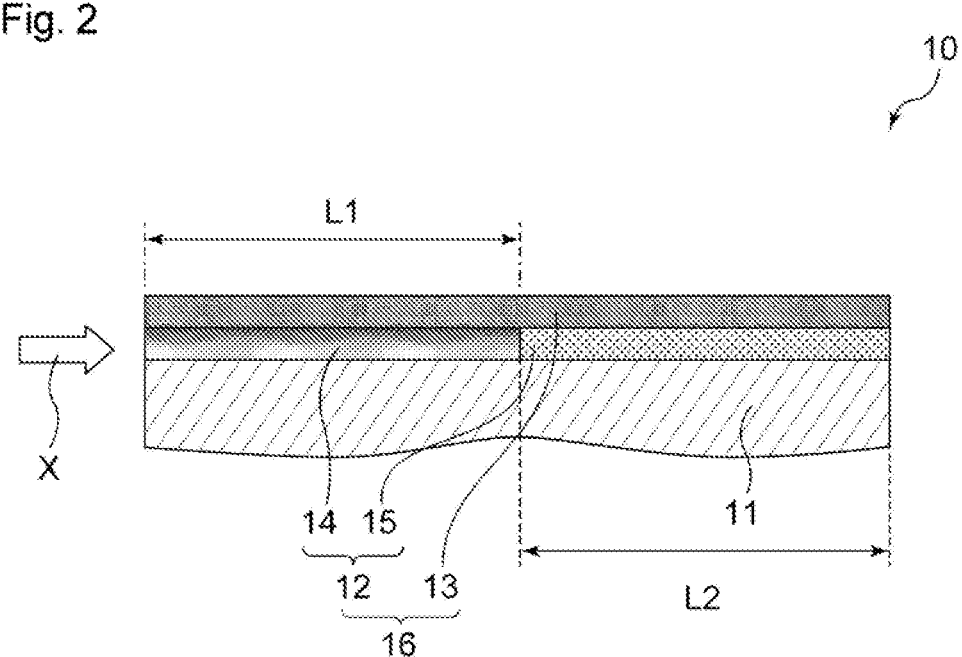
FIG. 2 is a partially enlarged schematic diagram of a cross section of the exhaust gas purifying catalyst shown in FIG. 1 taken along the line I-I'.

An example of an exhaust gas purifying catalyst according to the present embodiment is shown in FIGS. 1 and 2. As shown in FIG. 1, an exhaust gas purifying catalyst 10 is housed in a casing 20, and is placed in a path through which an exhaust gas flows. As shown in FIGS. 1 and 2, the exhaust gas purifying catalyst 10 includes a porous substrate 11 and a catalyst layer 16 formed on the porous substrate 11. The catalyst layer 16 may be a monolayer or a multilayer. In the case where the catalyst layer 16 is a multilayer, one of the layers included in the multilayer may include a first section 14 and a second section 15, which are arranged in the exhaust gas flow direction X. The first section 14 is located on the upstream side in the exhaust gas flow direction X relative to the second section 15.

In the example shown in FIG. 2, the catalyst layer 16 has a two-layer configuration that includes a lower catalyst layer 12 and an upper catalyst layer 13 formed on a surface of the lower catalyst layer 12 that is the other side than the porous substrate side. The lower catalyst layer 12 includes the first section 14 and the second section 15. As will be described later, the concentration gradient of a specific element, which is a catalytically active component, in the thickness direction in the first section 14 and that in the second section 15, may be different or the same.

The first section 14 and the second section 15 are preferably in contact with each other in the exhaust gas flow direction X with no gap therebetween, in view of efficiently increasing the temperature of the second section 15 by heat generated by exothermic reactions such as HC oxidation and CO oxidation facilitated by the catalytically active component contained in the first section 14. In the example shown in FIG. 2, the first section 14 and the second section 15 are formed on the surface of the porous substrate 11, but may be formed with another catalyst layer interposed between the porous substrate 11 and the catalyst layer 12. Another catalyst layer may also be formed on a surface of the upper catalyst layer 13 that is the other side than the lower catalyst layer side, or the upper catalyst layer 13 may be the outermost layer.

The porous substrate 11 may have the shape of honeycomb, a DPF, or a GPF. Examples of the material of the porous substrate 11 include ceramics such as alumina ($Al_2O_3$), mullite ($3Al_2O_3$-$2SiO_2$), cordierite ($2MgO$-$2Al_2O_3$-$5SiO_2$), aluminum titanate ($Al_2TiO_5$), and silicon carbide (SiC), and metal materials such as stainless steel. An exhaust gas purifying catalyst 10 including a porous substrate 11 and a catalyst layer formed on the surface of the porous substrate 11 is also called a catalyst converter. In the example shown in FIG. 1, the porous substrate 11 has a shape elongated in one direction, and is disposed such that the lengthwise direction of the porous substrate 11 matches the exhaust gas flow direction X. In FIG. 1, R indicates a boundary portion between the first section 14 and the second section 15.

The lower catalyst layer 12 contains a specific element as a catalytically active component. The specific element herein refers to a single element and is, for example, palladium (Pd), platinum (Pt), or rhodium (Rh). In particular, in view of obtaining high purification performance for carbon monoxide (CO) and hydrocarbon (HC), and a warming function, the specific element is preferably palladium (Pd) or platinum (Pt), and more preferably palladium (Pd).

The specific element concentration $a3$ in the first section 14 is preferably higher than the specific element concentration $b3$ in the second section 15 particularly in view of concentrating the specific element on the surface side on the upstream side to enhance the exhaust gas purification performance when starting the engine and when driving at high speeds. In the exhaust gas purifying catalyst 10, the first section 14 contains the specific element. On the other hand, the second section 15 may or may not contain the specific element.

The concentrations $a3$ and $b3$ are expressed in terms of mass per unit volume. Specifically, the specific element concentration $a3$ in the first section 14 refers to an amount obtained by dividing the mass of the specific element contained in the first section 14 by volume V1 (see FIG. 1), which is the volume of a portion of the porous substrate 11 where the first section 14 is provided. For example, in the case where a first section 14 is formed by applying a slurry for forming the first section 14 to an upstream half of the porous substrate 11 in the exhaust gas flow direction, volume V1, which is the volume of the portion of the porous substrate 11 where the first section 14 is provided, refers to the volume of the upstream half of the porous substrate 11. Likewise, the specific element concentration $b3$ in the second section 15 refers to an amount obtained by dividing the mass of the specific element contained in the second section 15 by volume V2 (see FIG. 1), which is the volume of a portion of the porous substrate 11 where the second section 15 is provided. Herein, the amount of a catalytically active component including a specific element is the mass in terms of metal. In the exhaust gas purifying catalyst according to the present invention, the catalytically active component including the specific element is not necessarily present in the form of a metal, and may be present in the form of an oxide. The volume of a substrate as used herein refers to a volume calculated from the diameter and the length of the substrate including internal pores and a catalyst layer.

In view of enhancing the exhaust gas purification performance when starting the engine and when driving at high speeds, the ratio of the specific element concentration $a3$ in the first section 14 to the specific element concentration $b3$ in the second section 15, $a3/b3$, is preferably 1.1 or more, more preferably 1.2 or more, and even more preferably 2.0 or more. Even when the second section 15 does not contain the specific element, the catalyst exhibits sufficient purification performance when driving at high speeds. However, in view of further enhancing the purification performance when driving at high speeds, it is desirable that the ratio $a3/b3$ be 100.0 or less, and more preferably to 20.0 or less.

The specific element concentration $a3$ in the first section 14 is preferably 0.1 g/L or more and 15 g/L or less, more preferably 1 g/L or more and 12 g/L or less, and even more preferably 2 g/L or more and 10 g/L or less, in view of reducing the amount of the catalytically active component and enhancing the exhaust gas purification performance when starting the engine and when driving at high speeds.

The specific element concentration $b3$ in the second section 15 is preferably 0 g/L or more and 10 g/L or less, more preferably 0 g/L or more and 5 g/L or less, and even more preferably 0.05 g/L or more and 3 g/L or less, in view of reducing the amount of the catalytically active component and enhancing the exhaust gas purification performance when starting the engine.

The concentration gradient of the specific element contained in the first section 14 in the thickness direction, $a1/a2$, is preferably greater than 1. Specifically, the concentration gradient of the specific element contained in the first section 14 in the thickness direction, $a1/a2$, refers to the ratio of mass $a1$ of the specific element on the surface side to mass $a2$ of the specific element on the other side (porous substrate side) when the first section 14 is divided in half along the thickness direction, i.e., divided in the surface side and the porous substrate side. In the first section 14, the concentration gradient is preferably continuous from the surface side to the substrate side in the thickness direction. The expression "the concentration gradient of a component is continuous in the thickness direction" means that, for example, the mass of the component decreases continuously from the surface side toward the substrate side in the thickness direction. Hereinafter, the term "thickness direction" refers to the thickness direction of the catalyst layer 12 unless otherwise stated.

The concentration gradient a1/a2 is preferably 1.1 or more in view of enhancing the exhaust gas purification effect when starting the engine and when driving at high speeds, in particular, when driving at high speeds. Also, the concentration gradient a1/a2 is preferably 5.0 or less in view of ease of preventing the progress of sintering of the catalytically active component and thermal durability of the catalytically active component. From the above viewpoints, the concentration gradient a1/a2 is more preferably 1.3 or more. Also, the concentration gradient a1/a2 is more preferably 3.0 or less, even more preferably 2.5 or less, and even much more preferably 2.0 or less.

As described above, the specific element as a catalytically active component is distributed such that the specific element concentration is higher in the first section than in the second section, and also that the amount of the specific element is larger on the surface side than on the substrate side in the first section, whereby the catalytic function of the specific element contained in the catalyst layer can be efficiently exhibited at a high space velocity.

In the conventional technology, there is a trade-off relationship between the exhaust gas purification performance under a high space velocity condition and the exhaust gas purification performance when starting the engine (light-off performance). However, in the present invention, the warming effect of the catalytically active component contained in the first section 14 is efficiently exhibited by the configuration as described above, and thus the exhaust gas purifying activity during low speed driving when starting the engine can be enhanced as compared with the catalyst design of Patent Literature 1, in which the catalytically active component is simply concentrated on the upstream side. The reason for this is probably as follows: by dispersing the catalytically active component concentratedly on the surface side rather than uniformly in the first section 14, CO oxidation and HC oxidation, which are exothermic reactions, are further facilitated, and thus the temperature increase rate of the catalyst can be increased. By increasing the temperature increase rate of the catalyst, $NO_x$ reducibility is also improved.

The concentration gradient of the specific element contained in the first section 14 can be determined using, specifically, the following method.

Figure 4:
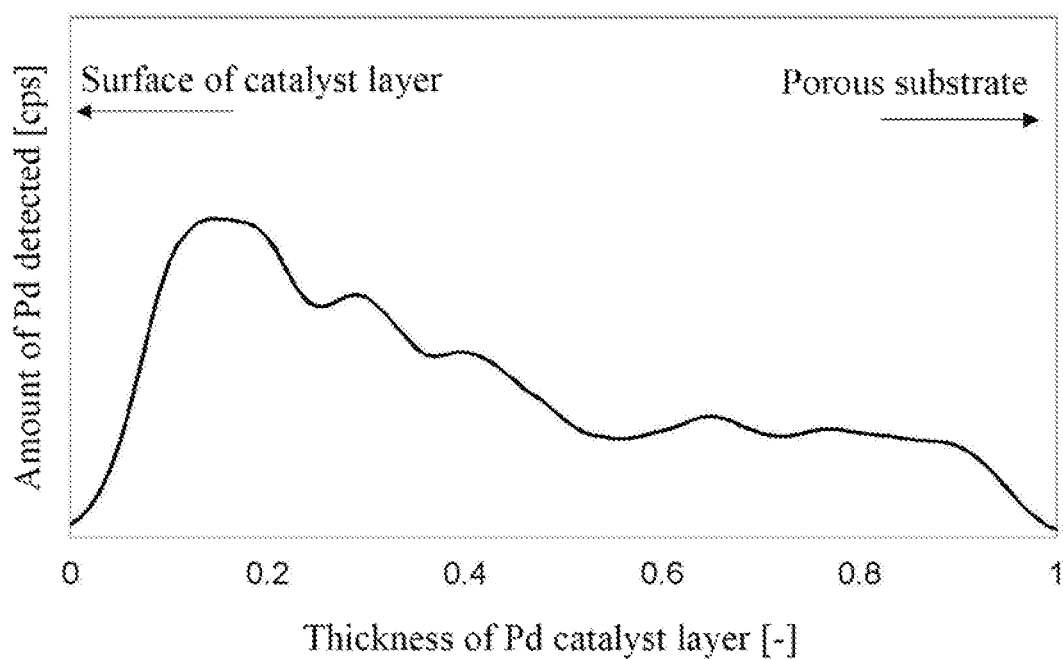
FIG. 4 shows a fluctuation curve obtained through line analysis using EDX performed on the first section of the exhaust gas purifying catalyst produced in Example 1.

The exhaust gas purifying catalyst including the substrate is cut along a cross section perpendicular to the exhaust gas flow direction using a band saw or the like. The cut piece of the catalyst is embedded in an epoxy resin to obtain a sample having a surface in which the cross section of the catalyst is exposed. A fluctuation curve of the specific element in the sample is obtained by digitizing a distribution of the specific element (unit: cps) through EDX line analysis of the sample, and in the fluctuation curve, the ratio of an integral value of the counts on the surface side, which extends toward the surface from a position at half the length of the catalyst layer 12 in the thickness direction, to an integral value of the counts on the substrate side, which extends toward the substrate from that position is obtained. The ratio obtained is converted to a mass ratio, which is defined as the concentration gradient of the specific element in the thickness direction. The integral values of the counts can be obtained by horizontally mounting the sample on a stage without any incline, performing measurement in each of 10 observation fields under the conditions of an acceleration voltage of 25 kV, an electron beam spot diameter of 1 μm, and a measurement distance of 100 μm, and determining the average value of the measurement results obtained in the 10 observation fields. Specifically, a distribution curve of the specific element in the first section 14 in the thickness direction as defined above is obtained for each of 10 different observation fields. The distribution of the specific element is normalized in the thickness direction such that the total thickness of the first section 14 is regarded as 1 as shown in FIG. 4, and the results of the analysis for the 10 observation fields are averaged. In this way, an average distribution of the specific element in thickness direction of the first section 14 can be obtained. The same applies to the second section 15.

For example, in the case where the first section 14 is formed directly on the porous substrate 11, the boundary in the thickness direction between the porous substrate 11 and the first section 14 can be confirmed based on changes in the concentration of the specific element (for example, Pd) determined by EDX line analysis performed on the catalyst layer in the thickness direction, and, for example, an inflection point obtained by differentiating the Pd concentration distribution curve can be used as the reference. In this case, the boundary between the porous substrate and the first section 14 is a point (A) between a region in which there is substantially no Pd and a region in which Pd is detected. The same applies to the case where an upper catalyst layer 13 is formed on a surface of the first section 14 that is the other side than the substrate side. For example, in the case where Pd is contained in the first section 14 and not in the upper catalyst layer 13, the boundary between the first section 14 and the upper catalyst layer 13 is a point (B) at which the Pd detection intensity drops sharply to 20% or less relative to the maximum detection intensity.

In the case where the second section 15 of the exhaust gas purifying catalyst 10 contains the specific element, the concentration gradient of the specific element contained in the second section 15 in the thickness direction may be the same as or different from the concentration gradient of the specific element contained in the first section 14 in the thickness direction. The concentration gradient of the specific element contained in the second section 15 in the thickness direction refers to the ratio of mass b1 of the specific element on the surface side to mass b2 of the specific element on the other side (porous substrate side), i.e., b1/b2, when the second section 15 is divided in half along the thickness direction, i.e., divided in the surface side and the porous substrate side. The ratio b1/b2 can be determined in the same manner as the ratio a1/a2.

The gradient in the thickness direction of the total concentration of the three different catalytically active components contained in the second section 15 may also be the same as or different from the gradient in the thickness direction of the total concentration of the three different catalytically active components contained in the first section 14.

In view of ease of production of the exhaust gas purifying catalyst, the concentration gradient of the specific element contained in the second section 15 is preferably such that the ratio b1/b2 is 0.9 or more and 3.0 or less.

As described above, it is preferable in the present invention that the concentration control as described above be performed on the single specific element; however, the same concentration control as above may be additionally performed on the total amount of catalytically active components, specifically, the total amount of palladium (Pd), platinum (Pt), and rhodium (Rh). For example, the gradient of the total concentration of the three different catalytically active components contained in the first section 14 may be tailored to satisfy the same range as that for the ratio a1/a2 described above. Likewise, the total concentration of the three different catalytically active components contained in the first section 14 may be tailored to be higher than the total concentration of the three different catalytically active components contained in the second section 15. The ratio of the total concentration of the three different catalytically active components contained in the first section 14 to the total concentration of the three different catalytically active components contained in the second section 15, in terms of mass per unit volume, may be tailored to satisfy the same range as the preferred range of the ratio a3/b3 described above. The total concentration of the three different catalytically active components contained in the first section 14 and the total concentration of the three different catalytically active components contained in the second section 15 may be tailored to satisfy the same range as the preferred ranges of the concentrations a3 and b3 described above, respectively. The concentration gradient of the total concentration of the three different catalytically active components contained in the second section 15 in the thickness direction may be tailored to satisfy the same range as the preferred range of the ratio b1/b2 described above.

It is preferable that the first section 14 and the second section 15 further contain a support component that loads the catalytically active component, in view of efficiently exhibiting the exhaust gas purification performance of the catalytically active component such as the specific element. As the support component used herein, an oxygen storage component (also called an "OSC material", OSC being an abbreviation for "oxygen storage capacity") and an inorganic oxide other than the oxygen storage component can be used. In the case where the exhaust gas purifying catalyst according to the present invention is used for a gasoline engine in which the theoretical air-to-fuel ratio is controlled, the catalyst layer 12 preferably contains an oxygen storage component as a support component because a high purification rate can be exhibited in a stable manner even when the air-to-fuel ratio varies. More preferably, the first section 14 and the second section 15 each contain an oxygen storage component. In the case where an oxygen storage component is contained, it is preferable that an oxygen storage component and an inorganic oxide other than the oxygen storage component be present in a mixed state.

In the case where the first section 14 and the second section 15 each contain an oxygen storage component, the first section 14 and the second section 15 may each contain an oxygen storage component of the same composition or may contain oxygen storage components of different compositions. Also, the first section 14 and the second section 15 may each contain an inorganic oxide other than the oxygen storage component of the same composition or may contain inorganic oxides other than the oxygen storage component of different compositions.

The oxygen storage component is preferably a ceria-zirconia composite oxide (hereinafter also referred to as $CeO_2$—$ZrO_2$) because the resulting exhaust gas purifying catalyst has high OSC. $CeO_2$—$ZrO_2$ is a solid solution of $CeO_2$ and $ZrO_2$. Whether a solid solution of $CeO_2$ and $ZrO_2$ has been formed can be confirmed by checking whether or not a single phase derived from $CeO_2$—$ZrO_2$ has formed, using an X-ray diffractometer (XRD). The oxygen storage component preferably has a porous body because it can easily load the catalytically active component. The porous body may have a BET specific surface area of 30 $m^2/g$ to 210 $m^2/g$.

In either one or both of the first section 14 and the second section 15, the oxygen storage component typically contains $CeO_2$—$ZrO_2$, and the oxygen storage component may contain a rare earth element other than cerium or an alkaline earth metal element such as Ba, Sr, or Ca. Examples of the rare earth element other than cerium include scandium (Sc), yttrium (Y), lanthanum (La), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu). These rare earth elements are added as, for example, an oxide to the oxygen storage component. The oxide of a rare earth element is a sesquioxide ($Ln_2O_3$, where Ln is a rare earth element) except for the case where the rare earth element is praseodymium (Pr) or terbium (Tb). The oxide of a rare earth element may be a composite oxide of two or more of the rare earth elements listed above. Praseodymium oxide is normally $Pr_6O_{11}$, and terbium oxide is normally $Tb_4O_7$. The oxide of a rare earth element other than cerium may or may not form a solid solution together with $CeO_2$—$ZrO_2$. Whether or not the oxide of a rare earth element other than cerium and $CeO_2$—$ZrO_2$ have been formed into a solid solution can be checked in the same manner as described above using an X-ray diffractometer (XRD).

As the oxygen storage component, it is also possible to use an oxide of an element of which valence state is likely to change under conditions for use of the catalyst, such as Mn, Fe, or Cu, and a composite oxide containing these elements.

The exhaust gas purifying catalyst according to the present invention has sufficient OSC when the first section 14 and the second section 15 each contain an OSC material.

In the exhaust gas purifying catalyst according to the present invention, the amount of $CeO_2$ in the first section 14 is preferably 10 mass % or more and 50 mass % or less, and more preferably 15 mass % or more and 40 mass % or less, in view of exhibiting OSC to enhance the exhaust gas purification performance at low temperatures. The amount of $ZrO_2$ in the first section 14 is preferably 10 mass % or more and 60 mass % or less, and more preferably 15 mass % or more and 50 mass % or less. As used herein, the amount of $CeO_2$ and that of $ZrO_2$ respectively include the amount of $CeO_2$ derived from $CeO_2$—$ZrO_2$ and the amount of $ZrO_2$ derived from $CeO_2$—$ZrO_2$ (hereinafter, the same applies to the amount of $CeO_2$ and that of $ZrO_2$).

Also, the amount of $CeO_2$ and the amount of $ZrO_2$ in the second section 15 are preferably within the same ranges as described above for the amount of $CeO_2$ and the amount of $ZrO_2$ in the first section.

In the case where the first section 14 contains an oxide of a rare earth element other than cerium as another element other than $CeO_2$—$ZrO_2$, the amount of the oxide of a rare earth element other than cerium in the first section 14 is preferably 30 mass % or less, and more preferably 3.0 mass % or more and 20 mass % or less, in view of further enhancing thermal stability. Also, in the case where the second section 15 contains an oxide of a rare earth element other than cerium, the amount of the oxide of a rare earth element other than cerium in the second section 15 is preferably within the same range as described above for the amount of the oxide of a rare earth element other than cerium in the first section 14.

Examples of an inorganic oxide other than the oxygen storage component that may be contained in the first section 14, the second section 15, and the upper catalyst layer 13 include metal oxides other than the oxygen storage component, for example, rare earth oxides ($Re_2O_3$) such as $Al_2O_3$, $ZrO_2$, $SiO_2$, $TiO_2$, and $La_2O_3$, oxide materials based on zeolite (aluminosilicate), MgO, ZnO, and $SnO_2$, and composite oxide materials of these materials. Other examples include phosphates and borates of Al, Zr, Si, Ti, rare earth elements, Mg, Zn, and the like, poorly soluble sulfates of alkaline earth metals such as Ba and Sr. The inorganic oxide other than the oxygen storage component preferably has a porous body. The porous body may have a BET specific surface area of 30 m$^2$/g to 600 m$^2$/g.

As used herein, the term "inorganic oxide other than the oxygen storage component" encompasses inorganic oxides that are modified with the oxygen storage component or load the oxygen storage component. For example, the outer surface and the inner surface of pores of alumina or the like may be modified with $CeO_2$. As used herein, the term "modify" encompasses a loaded state, and specifically, a state in which fine particles of an oxygen storage component are dispersed on the outer surface and the inner surface of pores of alumina or the like. Alumina may be modified with lanthanum oxide, $ZrO_2$, or the like.

In the exhaust gas purifying catalyst according to the present invention, the amount of an inorganic oxide other than the oxygen storage component contained in the first section 14 is preferably 5 mass % or more and 80 mass % or less, and more preferably 10 mass % or more and 60 mass % or less, in view of further enhancing the exhaust gas purification performance. Also, the amount of an inorganic oxide other than the oxygen storage component contained in the second section 15 is preferably within the same range as described above for that in the first section 14.

In the exhaust gas purifying catalyst according to the present invention, either one or both of the first section 14 and the second section 15 may contain an alkaline earth metal compound in view of heat resistance. Preferred alkaline earth metals include strontium (Sr) and/or barium (Ba). The alkaline earth metal compound may be a nitrate, a carbonate, or an oxide.

In the case where the first section 14 contains an alkaline earth metal compound, the amount of the alkaline earth metal compound in the first section 14 in terms of alkaline earth metal is preferably 1 mass % or more and 25 mass % or less, and more preferably 3 mass % or more and 20 mass % or less, in view of further enhancing the exhaust gas purification performance. Also, in the case where the second section 15 contains an alkaline earth metal compound, the amount of the alkaline earth metal compound in the second section 15 is preferably within the same range as described above for that in the first section 14.

In the first section 14 and the second section 15, the catalytically active component is preferably loaded on an OSC material and an inorganic oxide described above. In some cases, the catalytically active component may be further loaded on an OSC material other than $CeO_2$—$ZrO_2$ and an alkaline earth metal compound described above.

The term "A loaded on B" herein refers to a state of particle A is chemically or physically adsorbed or held on the outer surface of particle B or the inner surface of pores of a particle B. Specifically, the state of particle B having particle A loaded thereon can be confirmed by measuring the particle sizes for example in SEM (scanning electron microscope). For example, the average particle size of particle A present on the surface of particle B is preferably 10% or less, more preferably 3% or less, even more preferably 1% or less, of that of particle B. As used herein, the term "average particle size" refers to the average value of maximum Feret diameters of 30 particles or more when observed with an SEM. The maximum Feret diameter refers to the largest distance between two parallel lines coming into contact with the particle contour.

The ratio between the length L1 of the first section 14 and the length L2 of the second section 15 in the exhaust gas flow direction X, i.e., L1:L2, is preferably 1:0.2 to 4 (inclusive) in view of further enhancing the exhaust gas purification performance when starting the engine and when driving at high speeds and ease of production. The ratio L1:L2 is preferably 1:0.2 or more because the effect of improving the purification rate when starting the engine is sufficiently exhibited. The ratio L1:L2 is preferably 1:4 or less because the purification rate when driving at high speeds can be increased. From the above viewpoints, the ratio L1:L2 is particularly preferably 1:0.5 to 3 (inclusive).

A method for determining the lengths of the first section 14 and the second section 15 will be described.

First, a catalyst 10 as is usually has a size that is difficult to measure with an apparatus described later. Accordingly, the catalyst 10 is cut to obtain a cylindrical catalyst sample with a diameter of 20 to 30 mm. On this occasion, the catalyst 10 is cut so that the resulting cylindrical catalyst sample has a length corresponding to the entire length of the catalyst 10 in the lengthwise direction of the catalyst 10 and a central axis matching the lengthwise direction of the catalyst 10. By cross sections perpendicular to the central axis, the cylindrical catalyst sample is equally divided into 20 pieces along the central axis from an upstream side end to a downstream side end of the catalyst 10, to thereby obtain 20 test pieces. Each of the 20 test pieces is analyzed in terms of weight, volume, and composition, and then the specific element concentration (g/L) is calculated. The specific element concentration of each test piece can be determined using, for example, an X-ray fluorescence (XRF) analyzer or an ICP atomic emission spectrometer (ICP-AES).

Figure 3:
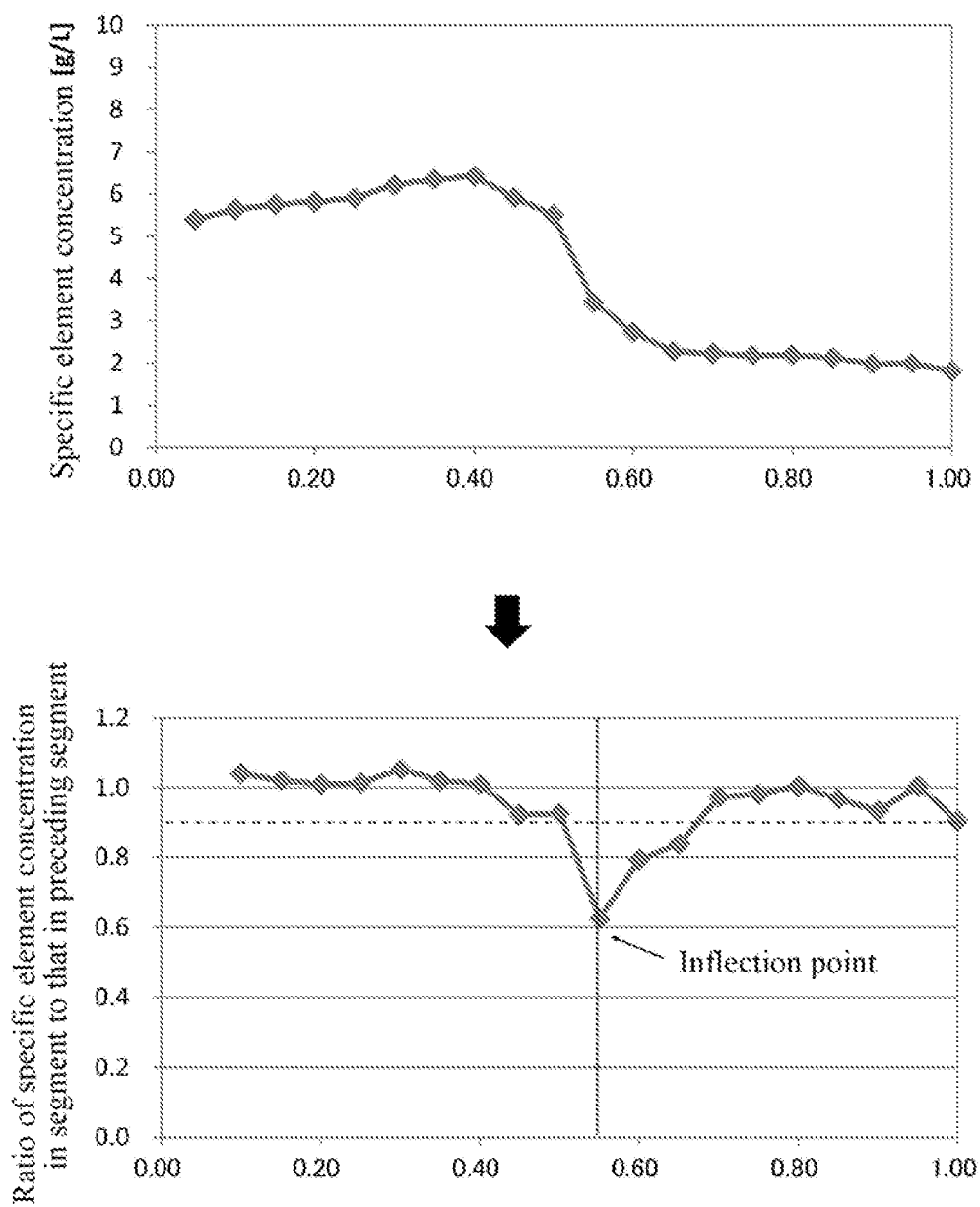
FIG. 3 shows an example of graphs showing changes in the specific element concentration in the exhaust gas flow direction X, the graph being obtained through sampling a gas purifying catalyst and created for determining an inflection point therefrom.

Next, the lengths of the first section 14 and the second section 15 can be determined from the results of analysis performed on the test pieces using, for example, a method as shown in FIG. 3. Specifically, from the results of analysis performed on the test pieces, the specific element concentration is determined for each segment obtained by dividing the length from the upstream side end to the downstream side end of the catalyst 10 into 20 segments (the graph on the upper side of FIG. 3). After that, the ratio of the specific element concentration in one segment to that in the preceding segment just before is determined, and then, a graph of the concentration ratio between segments is plotted, in which the horizontal axis corresponds to the position of each segment on the central axis of the sample (the graph on the lower side of FIG. 3). In the graphs on the upper and lower sides of FIG. 3, the upstream side end of the catalyst 10 and the downstream side end of the catalyst 10 correspond to 0.00 and 1.00, respectively, on the horizontal axis. When there is an inflection point with a concentration ratio of 0.9 or less in the graph, the inflection point is defined as the boundary between the first section 14 and the second section 15, and the position and length of each of the first section 14 and the second section 15 in the exhaust gas flow direction X of the catalyst 10 are thus specified. The graphs shown in FIG. 3 merely show an example of the results of measurement on the catalyst 10, and thus the graphs are not intended to limit the scope of the present invention.

For example, 10 or more cylindrical samples may be prepared, followed by determining the lengths of the first and second sections for each sample using the above-described method, and L1 and L2 can each be obtained by averaging the results of measurement on the samples.

Also, the length of a portion composed of the first section 14 and the second section 15 in the exhaust gas flow direction X is preferably 60% or more, more preferably 70% or more, and even more preferably 80% or more based on the length of the porous substrate 11 in the exhaust gas flow direction X.

Next, a preferred configuration of the upper catalyst layer 13 will be described, the upper catalyst layer 13 being formed on the surface of the lower catalyst layer 12 in the example shown in FIG. 2.

The upper catalyst layer 13 preferably contains a catalytically active component in view of obtaining an even greater exhaust gas purification effect. Also, the upper catalyst layer 13 preferably contains a catalytically active component that is different from the specific element contained in the lower catalyst layer 12. In particular, the upper catalyst layer 13 preferably contains rhodium (Rh). Specifically, it is preferable that the specific element be platinum (Pt) or palladium (Pd) while the upper catalyst layer 13 contains rhodium (Rh), in view of a purification effect on $NO_x$, CO, and HC with a good balance and a high $NO_x$ purification effect. It is most preferable that the specific element be palladium (Pd) while the upper catalyst layer 13 contains rhodium (Rh). Although palladium is susceptible to phosphorus poisoning, phosphorus poisoning of palladium is suppressed when rhodium is contained in the upper layer. In the case where the upper catalyst layer 13 contains rhodium (Rh), the upper catalyst layer 13 may further contain Pt and/or Pd.

The amount of the catalytically active component contained in the upper catalyst layer 13 is preferably 0.05 to 5 g per liter of the porous substrate 11, and more preferably 0.1 to 3 g per liter of the porous substrate 11, in view of obtaining a well-balanced purification effect on $NO_x$, CO, and HC.

It is preferable that the upper catalyst layer 13 further contain a support component that loads the catalytically active component, in view of efficiently exhibiting the exhaust gas purification performance of the catalytically active component. As the support component used here, a $ZrO_2$-based material, which will be described below, and an inorganic oxide other than the OSC component described for the lower catalyst layer 12 can be used.

The $ZrO_2$-based material is preferably a material containing mainly $ZrO_2$ and also containing Y, La, Ce, Pr, Nd, Sm, Gd, Yb, Mg, Ca, Sr, Ba, or the like as an additive.

The inorganic oxide is preferably an inorganic oxide containing mainly $Al_2O_3$ and also containing Y, Zr, La, Ce, Pr, Nd, Sm, Gd, Yb, Mg, Ca, Sr, Ba, or the like as an additive.

The amount of $ZrO_2$ contained in the upper catalyst layer 13 is preferably 20 mass % or more and 90 mass % or less, and more preferably 30 mass % or more and 70 mass % or less, in view of the performance of the catalytically active component.

Although the relationship between the thickness of the lower catalyst layer 12 and the thickness of the upper catalyst layer 13 depends on the application of the exhaust gas purifying catalyst, the ratio of the thickness of the upper catalyst layer 13 to that of the lower catalyst layer 12 is preferably 0.2 to 1.5, and more preferably 0.3 to 1.0. When the ratio of the thickness of the upper catalyst layer 13 to that of the lower catalyst layer 12 is 0.2 or more, it is possible to prevent aggregation of the catalytically active component caused by heat from the upper catalyst layer 13. Also, when the ratio of the thickness of the upper catalyst layer 13 to that of the lower catalyst layer 12 is 1.5 or less, the exhaust gas can be sufficiently diffused into the lower catalyst layer. Here, in the case where the first section 14 and the second section 15 have different thicknesses, the average value of the thicknesses of the first section 14 and the second section 15 is defined as the thickness of the lower catalyst layer 12.

In view of improving the exhaust gas purification performance with a limited amount of noble metals, the mass ratio between the lower catalyst layer 12 and the upper catalyst layer 13 is such that the amount of the upper catalyst layer 13 is preferably 10 parts by mass or more and 200 parts by mass or less, more preferably 20 parts by mass or more and 150 parts by mass or less, and even more preferably 30 parts by mass or more and 100 parts by mass or less, relative to 100 parts by mass of the lower catalyst layer 12.

In the case where the exhaust gas purifying catalyst includes an upper catalyst layer 13, the upper catalyst layer 13 is preferably formed on a surface of the lower catalyst layer 12 that is on the other side than the porous substrate side as shown in FIG. 2, in view of exhaust gas purification performance in low temperatures. In view of performing the function of the catalytically active component contained in the upper catalyst layer 13, the upper catalyst layer 13 is preferably present in an area covering 50% or more, and more preferably 80% or more, of the area where the lower catalyst layer 12 is present, in the exhaust gas flow direction X, and the upper catalyst layer 13 is most preferably present on the entire area of the lower catalyst layer 12.

The upper catalyst layer 13 may extend beyond the lower catalyst layer 12 on the downstream side in the exhaust gas flow direction X. In the case where the upper catalyst layer 13 extends beyond the lower catalyst layer 12 on the downstream side in the exhaust gas flow direction X, the extension length is preferably 20% or less, and more preferably 10% or less based on the total length of the lower catalyst layer 12 in the exhaust gas flow direction X.

Likewise, the upper catalyst layer 13 may extend beyond the lower catalyst layer 12 on the upstream side in the exhaust gas flow direction X. In the case where the upper catalyst layer 13 extends beyond the lower catalyst layer 12 on the upstream side in the exhaust gas flow direction X, the extension length is preferably 10% or less, and more preferably 5% or less based on the total length of the lower catalyst layer 12 in the exhaust gas flow direction X.

The lengths of the upper catalyst layer 13 and lower catalyst portion 12 can be determined by, for example, the same method for determining the lengths of the sections as described above, in the case where the two catalyst layers can be distinguished by different catalytically active components. Specifically, the length can be determined by preparing a cylindrical catalyst sample, equally dividing the cylindrical catalyst sample into 20 segments, and measuring the amount of the catalytically active component in each segment by the method described above.

In the present invention, the amounts of ceria and zirconia and the inorganic oxide other than the oxygen storage component among various components described above in a catalyst can be determined by dissolving the catalyst layer in alkali to obtain a solution, measuring the amount of each metals such as cerium, zirconium, and aluminum in the solution using ICP-AES, and combining the measurement results with results of analysis such as SIMS or EDS. The amount of a noble metal include the amount of the noble metal in the form of a metal and that in the form of an oxide, and can be obtained by, for example, measuring the amount of the noble metal in a solution obtained by dissolving a catalyst in alkali, using ICP-AES.

An exemplary preferred method for producing an exhaust gas purifying catalyst 10 according to the present embodiment may include the following steps.

Step (1) of preparing a slurry for forming the lower catalyst layer containing a support component and a liquid medium, applying the slurry for forming the lower catalyst layer to a substrate, and calcining the resultant to thereby producing a lower catalyst layer 12 prior to a surface enrichment process with a specific element, wherein the lower catalyst layer 12 contains the support component.

Step (2) of immersing a portion corresponding to a first section 14 in the lower catalyst layer 12 produced in step (1) in an aqueous solution containing the specific element, and then drying and calcining the resulting lower catalyst layer 12, to thereby load the specific element such that a larger amount of the specific element is incorporated into the surface side of the immersed portion (hereinafter also referred to as "surface enrichment process").

The portion of the lower catalyst layer 12 produced in step (1) that was immersed in the aqueous solution containing the specific element in step (2) will be a first section 14. Also, the portion of the lower catalyst layer 12 that was not immersed in the aqueous solution containing the specific element in step (2) and is located on the downstream side relative to the first section 14 in the exhaust gas flow direction X will be a second section 15.

Furthermore, preferably, step (3) described below may be additionally performed after step (2).

Step (3) of preparing a slurry for forming an upper catalyst layer 13 containing a support component, a salt of a catalytically active component, and a liquid medium, applying the slurry to a surface of the lower catalyst layer 12 that has undergone step (2), and drying and calcining the resultant to thereby form an upper catalyst layer 13 on the surface of the lower catalyst layer 12.

Step (1) described above may be replaced with step (1)' described below.

Step (1)' of preparing a slurry for forming a first section 14 and a slurry for forming a second section 15 both containing a support component and a liquid medium, applying either one of the slurries to an area of a substrate where a first section is to be formed, drying and calcining the resultant, and then applying the other slurry to an area of the substrate where a second section is to be formed, the area being located on the downstream side relative to the area where a first section is to be formed in the exhaust gas flow direction X, and calcining the resultant, to thereby form a first section 14 and a second section 15 on the substrate prior to a surface enrichment process.

In step (1)', the portion to which the slurry for forming a first section 14 has been applied will be the first section 14 before a specific element is loaded to increase the specific element concentration on the surface side, and the portion to which the slurry for forming a second section 15 has been applied will be the second section 15. In this case, a specific element is to be loaded in the first section 14 prior to a surface enrichment process formed in step (1)' to increase the specific element concentration on the surface side thereof, in step (2) described above.

The slurry for forming a lower catalyst layer prepared in step (1) and the slurry for forming a first section 14 and the slurry for forming a second section 15 prepared in step (1)' may or may not contain a specific element.

The concentration of a salt of a specific element in the slurry for forming a lower catalyst layer prepared in step (1) and the concentration of a salt of a specific element in the slurry for forming a first section 14 and the slurry for forming a second section 15 prepared in step (1)' may be tailored to satisfy the desirable amount of the specific element contained in the first section 14 and the second section 15.

As the support component contained in each slurry described above, an oxygen storage component described above and an inorganic compound other than the oxygen storage component may be used. As the liquid medium contained in each slurry described above, water may be used. As the salt of a catalytically active component such as a specific element contained in each slurry described above, for example, palladium nitrate, rhodium nitrate salt, and platinum nitrate may be used.

In view of the catalytic activity of the resulting exhaust gas purifying catalyst, the temperature for calcining the slurry applied on the substrate is preferably 400° C. to 800° C., and more preferably 450° C. to 600° C. The calcining time is preferably 0.5 hours to 6 hours, and more preferably 1 hour to 4 hours.

The slurry applied to the substrate is preferably dried before calcining. The drying temperature is preferably 40° C. to 200° C., and more preferably 70° C. to 150° C. The drying time is preferably 5 minutes to 6 hours, and more preferably 10 minutes to 2 hours.

As the aqueous solution containing a specific element used in step (2) described above, an aqueous solution of a salt of a catalytically active component such as palladium nitrate, rhodium nitrate salt, or platinum nitrate may be used. The concentration of a salt of a specific element in the aqueous solution is tailored to achieve the desirable amount of the specific element to be loaded on the catalyst layer in step (2).

The temperature of the aqueous solution in which the substrate is immersed is preferably 0° C. or more and 90° C. or less, and more preferably 10° C. or more and 50° C. or less. The immersion time is preferably 1 hour to 72 hours, and more preferably 6 hours to 48 hours. When the substrate is immersed, the specific element diffuses from the aqueous solution containing a salt of the specific element in the cells of the porous substrate to the catalyst layer 12 on the cell walls, and is adsorbed to the catalyst layer 12. Thus, the surface of the catalyst layer is advantageous for diffusion of the specific element, and a larger amount of the specific element is distributed in the surface of the catalyst layer.

The substrate that has undergone immersion is preferably dried. The drying temperature is preferably 40° C. to 200° C., and more preferably 70° C. to 150° C. The drying time is preferably 5 minutes to 6 hours, and more preferably 10 minutes to 3 hours.

Also, the calcining temperature after drying the substrate is preferably 400° C. to 800° C., and more preferably 450° C. to 600° C. The calcining time is preferably 30 minutes to 6 hours, and more preferably 1 hour to 4 hours.

Despite the fact that the amount of a catalytically active component used is limited, the exhaust gas purifying catalyst according to the present invention produced through the steps described above has an improved light-off performance and also an improved exhaust gas purification performance at a high space velocity as compared with exhaust gas purifying catalysts according to conventional technology, while these two performance were difficult to achieve at the same time with conventional technology. Accordingly, the exhaust gas purifying catalyst according to the present invention can be used as an exhaust gas purifying catalyst for an internal combustion engine that uses fossil fuel as a power source, such as a gasoline engine or a diesel engine, and can efficiently purify $NO_x$, HC, and CO.

EXAMPLES

Hereinafter, the present invention will be described in further detail by way of examples. However, the scope of the present invention is not limited to the examples given below. Both drying and calcining steps were performed in an atmosphere. The specific surface area was determined by the BET three-point method using a specific surface area and pore size distribution analyzer (model number: QUADRASORB SI) available from Quantachrome Corporation. Helium was used as the measurement gas.

Example 1

[1. Preparation of Base Slurry for Forming Lower Catalyst Layer]

An OSC material that had the following composition and specific surface area was provided.

$CeO_2$: 30 mass %, $ZrO_2$: 58 mass %, $La_2O_3$: 8 mass %, $Nd_2O_3$: 4 mass %, and specific surface area: 50 $m^2/g$ Whether $CeO_2$, $La_2O_3$, $Nd_2O_3$, and $ZrO_2$ had formed a solid solution in the OSC material was checked using the method described hereinbefore.

The OSC material, lanthanum oxide modified alumina (amount of $La_2O_3$ for modification: 3 mass %, and specific surface area: 100 $m^2/g$), barium acetate, and alumina sol were placed in a ball mill pot, water was added thereto, and they were mixed using a ball mill for 2 hours to thereby obtain a base slurry for forming a lower catalyst layer was thereby obtained. The ratio of the amounts of the components in the slurry was such that: OSC material 50 mass %, lanthanum oxide modified alumina 30 mass %, barium carbonate 10 mass %, and alumina 10 mass %.

[2. Formation of First Section Prior to Surface Enrichment Process]

The base slurry for forming a lower catalyst layer was used as-is as a slurry for forming a first section. A portion of a cordierite honeycomb porous substrate 11 (available from NGK Insulators, Ltd.) extending from the upstream end of the substrate 11 to the intermediate position of the substrate 11 in the exhaust gas flow direction X (hereinafter also referred to as "region A") was immersed in the slurry so as to apply the slurry to that portion of the substrate 11. After that, the porous substrate 11 with the slurry coating was dried at 150° C. for 2.5 hours, and then subjected to calcining at 450° C. for 2.5 hours to form a first section 14. The amount of the first section 14 was 160 g per liter of volume V1, which was the volume of a portion of the porous substrate 11 where the first section 14 was present.

[3. Formation of Second Section]

The base slurry for forming a lower catalyst layer was mixed with an aqueous solution of palladium nitrate, to thereby obtain a slurry for forming a second section. The amount of palladium nitrate in the slurry for forming a second section was adjusted such that the amount of Pd in the second section after calcining would be 1.25 mass %. A portion of the porous substrate 11 extending from the downstream end of the substrate 11 to the intermediate position of the substrate 11 in the exhaust gas flow direction X (hereinafter also referred to as "region B") was immersed in the slurry for forming a second section so as to apply the slurry to that portion of the substrate 11. After that, the porous substrate 11 with the slurry coating was dried at 150° C. for 2.5 hours, and then subjected to calcining at 450° C. for 2.5 hours to form a second section 15. The amount of the second section 15 was 160 g/L relative to volume V2 that was the volume of a portion of the porous substrate 11 on which the second section was present. The amount of Pd contained in the second section 15 was 2 g per liter of volume V2, which was the volume of a portion of the porous substrate 11 where the second section was present.

The first section 14 and the second section 15 adjoined on the substrate 11 in the exhaust gas flow direction X with no gap therebetween. The length ratio of the first section 14 to the second section 15 in the exhaust gas flow direction X was 1:1, and the length of the lower catalyst layer 12, which was composed of the first section 14 and the second section 15, in the exhaust gas flow direction X was the same as the length of the porous substrate 11 in the exhaust gas flow direction X. The thickness ratio of the first section 14 to the second section 15 was roughly 1:1.

[4. Loading of Pd by Surface Enrichment]

Only a portion of the porous substrate 11 where the first section 14 had been formed was immersed in an aqueous solution of palladium nitrate (concentration in terms of Pd: 6 g/L) at 25° C. for 48 hours. After the immersion, the porous substrate 11 was dried at 150° C. for 2.5 hours, and subjected to calcining at 450° C. for 2.5 hours. The amount of Pd in the first section 14 was 6 g per liter of volume V1, which was the volume of a portion of the porous substrate 11 where the first section 14 was present.

[5. Formation of Upper Catalyst Layer]

A $ZrO_2$-based material that had the following composition and specific surface area was provided: $ZrO_2$-based material containing 15 mass % of $CeO_2$, 73 mass % of $ZrO_2$, 8 mass % of $La_2O_3$, and 4 mass % of $Nd_2O_3$, with a BET specific surface area of 50 $m^2/g$.

Whether $CeO_2$, $ZrO_2$, $La_2O_3$, and $Nd_2O_3$ had formed a solid solution in the $ZrO_2$-based material was checked using the above-described method.

The $ZrO_2$-based material, lanthanum-modified alumina (amount of $La_2O_3$ for modification: 3 mass %, and BET specific surface area: 100 $m^2/g$), and alumina sol were placed in a ball mill pot, water was added thereto, and they were mixed using a ball mill for 2 hours to thereby obtain a base slurry for forming an upper catalyst layer. The obtained base slurry was mixed with an aqueous solution of rhodium nitrate to obtain a slurry for forming an upper catalyst layer. The ratio of the amounts of the components contained in the slurry for forming an upper catalyst layer was such that the ratio of the components other than rhodium contained in the upper catalyst layer after calcining would be as follows: 60 mass % of $ZrO_2$-based material, 30 mass % of lanthanum-modified alumina, and 10 mass % of alumina, and also such that the amount of rhodium in the upper catalyst layer would be 0.5 mass % after calcining.

The porous substrate 11 having the lower catalyst layer 12 was immersed in the slurry for forming an upper catalyst layer. After that, the porous substrate 11 with the slurry coating was dried at 150° C. for 2.5 hours, and then subjected to calcining at 450° C. for 2.5 hours to form an upper catalyst layer. Thus, an exhaust gas purifying catalyst of Example 1 was obtained. The upper catalyst layer covered the entire surface of the lower catalyst layer, and the ratio of the thickness of the upper catalyst layer to that of the lower catalyst layer was 0.6.

The amount of the upper catalyst layer was 60 g per liter of the volume (V1+V2) of the porous substrate 11. The amount of rhodium contained in the upper catalyst layer was 0.3 g per liter of the volume (V1+V2) of the porous substrate 11.

Example 2

In [2. Formation of First Section prior to Surface Enrichment Process] of Example 1 described above, a slurry for forming a first section obtained by mixing the base slurry for forming a lower catalyst layer with an aqueous solution of palladium nitrate was applied, instead of the base slurry for forming a lower catalyst layer, to the region A of a substrate 11 in the same manner as in Example 1. The substrate 11 with the resulting slurry coating was dried and subjected to calcining under the same conditions as in Example 1 to form a first section 14. The amount of palladium nitrate in the slurry for forming a first section was such that the amount of palladium nitrate would be 1.25 mass % in the first section 14 after calcining and before a surface enrichment process.

The amount of the first section 14 after calcining and before a surface enrichment process was 160 g per liter of volume V1, which was the volume of a portion of the porous substrate 11 where the first section 14 was present, and the amount of palladium contained in the first section 14 was 2 g per liter of volume V1.

A second section 15 was formed on the porous substrate 11 having the first section 14 in the same manner as in [3. Formation of Second Section] of Example 1. After that, Pd enrichment was performed on the surface side of the first section 14 in the same manner as in [4. Loading of Pd by Surface Enrichment] of Example 1, except that the Pd concentration in an aqueous solution of palladium nitrate was changed to 4 g/L (in terms of Pd). The amount of palladium loaded in the first section after this enrichment process was 6 g per liter of volume V1, which was the volume of a portion of the porous substrate 11 where the first section 14 was present. Then, an upper catalyst layer was formed in the same manner as in [5. Formation of Upper Catalyst Layer] of Example 1. Thus, an exhaust gas purifying catalyst was obtained.

Example 3

A first section 14 was formed in the same manner as in Example 2, except the following: in [2. Formation of First Section prior to Surface Enrichment Process], the amount of palladium nitrate in the slurry for forming a first section was adjusted such that the amount of palladium nitrate in the first section 14 after calcining and before the surface enrichment process would be 2.5 mass %, and the amount of palladium contained in the first section 14 would be 4 g/L.

Next, a second section 15 was formed in the same manner as in Example 1. After that, a surface enrichment process was performed on the first section 14 in the same manner as in [4. Loading of Pd by Surface Enrichment] of Example 1, except that the Pd concentration in an aqueous solution of palladium nitrate was changed to 2 g/L (in terms of Pd). The amount of palladium contained in the first section 14 after this enrichment process was 6 g per liter of volume V1, which was the volume of a portion of the porous substrate 11 where the first section 14 was present.

Then, an upper catalyst layer was formed in the same manner as in Example 1. Thus, an exhaust gas purifying catalyst was obtained.

Comparative Example 1

An exhaust gas purifying catalyst was obtained in the same manner as in Example 3, except that the following [Step of Forming Lower Catalyst Layer] was performed instead of steps 2 to 4 of Example 1.

[Step of Forming Lower Catalyst Layer]
The entirety of the porous substrate 11 was immersed in the slurry for forming a first section prepared in Example 3, and the porous substrate 11 with the slurry coating was then dried and subjected to calcining under the same conditions as in Example 3, to thereby form a lower catalyst layer in which the specific element was uniformly distributed. The amount of the lower catalyst layer was 160 g per liter of the volume (V1+V2) of the porous substrate 11. The amount of palladium contained in the lower catalyst layer was 4 g per liter of the volume (V1+V2) of the porous substrate 11. After that, the step of [5. Formation of Upper Catalyst Layer] was performed immediately without performing the surface enrichment step of Example 3.

Comparative Example 2

An exhaust gas purifying catalyst was obtained in the same manner as in Example 1, except that the following [Step of Forming Lower Catalyst Layer Having Enriched Surface] was performed instead of steps 2 to 4 of Example 1.

[Step of Forming Lower Catalyst Layer Having Enriched Surface]
The entirety of the porous substrate 11 was immersed in the above-described base slurry for forming a lower catalyst layer to apply the slurry to the porous substrate 11. After that, the porous substrate 11 with the slurry coating was dried at 150° C. for 2.5 hours, and then subjected to calcining at 450° C. for 2.5 hours to form a lower catalyst layer containing no catalytically active component.

Next, the entirety of the porous substrate 11 was immersed in an aqueous solution of palladium nitrate (concentration in terms of Pd: 4 g/L) at 25° C. for 48 hours. The porous substrate 11 after immersion was dried at 150° C. for 2.5 hours, and then subjected to calcining at 450° C. for 2.5 hours to form a lower catalyst layer containing Pd. The amount of the lower catalyst layer was 160 g per liter of the volume (V1+V2) of the porous substrate 11. The amount of palladium contained in the lower catalyst layer was 4 g per liter of the volume (V1+V2) of the porous substrate 11.

Comparative Example 3

In [2. Formation of First Section prior to Surface Enrichment Process] of Example 3, the amount of palladium nitrate in the slurry for forming a first section 14 was changed such that the amount of palladium contained in the first section 14 after calcining would be 3.75 mass %. A first section in which palladium was uniformly distributed was formed in the same manner as in [2. Formation of First Section prior to Surface Enrichment Process] of Example 3 except for the above. The amount of the first section 14 was 160 g per liter of volume V1, which was the volume of a portion of the porous substrate 11 where the first section 14 was present, and the amount of palladium contained in the first section was 6 g per liter of volume V1, which was the volume of a portion of the porous substrate 11 where the first section 14 was present. [4. Loading of Pd by Surface Enrichment] of Example 3 was not performed.

An exhaust gas purifying catalyst was obtained in the same manner as in Example 3 except for the above.

Comparative Example 4

In [2. Formation of First Section prior to Surface Enrichment Process] of Example 3, the amount of palladium nitrate in the slurry for forming a first section was changed such that the amount of palladium contained in the first section after calcining would be 5 mass %. A first section in which palladium was uniformly distributed was formed in the same manner as in [2. Formation of First Section prior to Surface Enrichment Process] of Example 3 except for the above. The amount of palladium contained in the first section was 8 g per liter of volume V1, which was the volume of a portion of the porous substrate 11 where the first section was present. Also, in [2. Formation of First Section prior to Surface Enrichment Process] of Example 3, the above-described base slurry for forming a lower catalyst layer as is was used as a slurry for forming a second section (that is, the palladium concentration in the second section was 0 g/L). [4. Loading of Pd by Surface Enrichment] of Example 3 was not performed.

An exhaust gas purifying catalyst was obtained in the same manner as in Example 3 except for the above.

catalysts that had undergone the durability test was installed in a vehicle described below. For the vehicle test, the vehicle was driven in accordance with the driving conditions of the Worldwide harmonized Light vehicles Test Cycles (WLTC). The amount of emitted (emission value) of hydrocarbon (HC) contained in the exhaust gas was measured for each of the following periods: a low speed driving period (WLTC-L) (from 0 to 589 seconds after the start of driving); and a high speed driving period (from 1022 to 1477 seconds after the start of driving). The emission values of the low speed driving period (WLTC-L) and the high speed driving period (WLTC-H) are shown in Table 1. These emission values are relative to those in Comparative Example 1 as the reference values, which are each regarded as 1.

Conditions for Determining Purification Rate
  Vehicle used for evaluation. Light passenger car (660 cc)
  Gasoline used: fuel for verification test

TABLE 1

| | Amount of Pd Loaded [g/L] (per volume of applied portion) | | | | Relationship between Regions A/B and First/Second Sections | | Pd Concentration Gradient | | | WLTC:THC Emission (Emission in Comparative Example: 1.00) | |
|---|---|---|---|---|---|---|---|---|---|---|---|
| | Region A (L 150%) | | Region B (L 50%) | | | | $a3/b3$ Gradient in flow direction | Gradient $a1/a2$ in first section | Gradient $b1/b2$ in second section | WLTC-L (when starting engine) | WLTC-H (when driving at high SV) |
| | Uniform loading | Surface enrichment | Uniform loading | Surface enrichment | First section | Second section | | | | | |
| Comp. Ex. 1 | 4 | | 4 | | A + B | — | — | 1.07 | — | 1,000 | 1.000 |
| Comp. Ex. 2 | | 4 | | 4 | A + B | — | — | 2.85 | — | 0.906 | 0.945 |
| Comp. Ex. 3 | 6 | | 2 | | A | B | 3 | 1.02 | 1.01 | 0.863 | 1.221 |
| Comp. Ex. 4 | 8 | | | | A | B | ∞ | 1.09 | 1.00 | 0.775 | 1.754 |
| Ex. 1 | | 6 | 2 | | A | B | 3 | 2.49 | 1.03 | 0.783 | 1 099 |
| Ex. 2 | 2 | 4 | 2 | | A | B | 3 | 1.81 | 1.03 | 0.720 | 1.010 |
| Ex. 3 | 4 | | 2 | 2 | A | B | 3 | 1.43 | 1.02 | 0.701 | 1.164 |

Concentration gradients a1/a2 and b1/b2 were measured using the method described above for each of the exhaust gas purifying catalysts of Examples 1 to 3 and Comparative Examples 1 to 4. As the EDX, XM-8101 available from JEOL Ltd. was used. The results are shown in Table 1. A fluctuation curve obtained through line analysis performed on the first section in Example 1 is shown in FIG. 4.

The exhaust gas purifying catalysts of Examples 1 to 3 and Comparative Examples 1 to 4 were each exposed to the following degradation conditions for a durability test comparable to driving 50,000 to 100,000 kilometers.

Specifically, while an exhaust gas discharged by running an engine under the following conditions was brought into contact with an exhaust gas purifying catalyst, the catalyst temperature was maintained at a temperature described below for the following length of time.

Degradation Conditions
  Engine used for durability test: 2 L NA gasoline engine for passenger vehicles
  Gasoline used: commercially available regular gasoline
  Temperature and time for degradation: 900° C., 100 hrs.
  Changes in air-to-fuel ratio in preceding stage of catalyst: A/F=13.5 (10 sec)→15.5 (20 sec)→13.5 (10 sec), this cycle was repeated.

After performing the durability test under the above-described conditions, each of the exhaust gas purifying As shown in Table 1, the degree of reduction in the total amount of HC (THC) discharged when starting the engine (WTLC-L) was low even when the configuration was changed from a simple configuration including two catalyst layers (Comparative Example 1) to a configuration including a lower layer having a palladium-enriched surface (Comparative Example 2), and a configuration including a lower layer having a palladium-enriched portion on its upstream side (the first section) (Comparative Example 3). In contrast, the total amount of HC discharged was reduced significantly in Examples, in which the lower layer has a higher palladium concentration on the upstream side (the first section) than on the downstream side (the second section) and also a higher palladium concentration on the surface side of the first section than that on the substrate side of the first section.

On the other hand, as shown in Table 1, the total amount of HC discharged when driving at high speeds (WTLC-H) decreased slightly when the configuration was changed from the simple configuration including two catalyst layers (Comparative Example 1) to the configuration including a lower layer having a palladium-enriched surface (Comparative Example 2); however, when the configuration was changed to the configuration including a lower layer having a palladium-enriched portion on its upstream side (the first section) of the lower layer (Comparative Example 3), the total amount of HC discharged when driving at high speeds (WTLC-H) increased, which degraded the exhaust gas purification performance. In contrast, the exhaust gas purification performance in Examples when driving at high speeds was enhanced to a degree comparable to that of Comparative Example 1, because a design advantageous for diffusion of HC was used in which the lower layer has a higher palladium concentration on the upstream side (the first section) than on the downstream side (the second section) and also a higher palladium concentration on the surface side of the first section than on the substrate side of the first section.

INDUSTRIAL APPLICABILITY

According to the present invention, there is provided an exhaust gas purifying catalyst which achieves an enhanced light-off performance and also an enhanced exhaust gas purification performance at a high space velocity by using a reduced amount of noble metals to thereby achieve a high exhaust gas purification performance both when starting the engine and when driving at high speeds.

The invention claimed is:

1. An exhaust gas purifying catalyst comprising a first catalyst layer including a first section and a second section in an exhaust gas flow direction, the first section being located on an upstream side in the exhaust gas flow direction relative to the second section,
    wherein the first section and the second section of the first catalyst layer each contains a catalytically active component including a specific element,
    a concentration of the specific element in the first catalyst layer is higher in the first section than in the second section, in terms of mass per unit volume,
    a ratio of a1 to a2, a1/a2, is 1.1 or more, where a1 represents a mass of the specific element that is present on a surface side of the first section of the first catalyst layer when the first section is divided in half along a thickness direction of the first catalyst layer, and a2 represents a mass of the specific element that is present on another side than the surface side of the first section of the first catalyst layer, and
    a ratio of b1 to b2, b1/b2, is 0.9 or more and 1.03 or less, where b1 represents a mass of the specific element that is present on a surface side of the second section of the first catalyst layer when the second section is divided in half along a thickness direction of the first catalyst layer, and b2 represents a mass of the specific element that is present on another side than the surface side of the second section of the first catalyst layer.

2. The exhaust gas purifying catalyst according to claim 1, wherein the ratio a1/a2 is 1.1 or more and 5.0 or less.

3. The exhaust gas purifying catalyst according to claim 1, wherein a ratio of the concentration of the specific element contained in the first section to that in the second section is 1.1 or more, the concentration being in terms of mass per unit volume.

4. The exhaust gas purifying catalyst according to claim 3, wherein the ratio of the concentration of the specific element contained in the first section to that in the second section is 2.0 or more and 100 or less.

5. The exhaust gas purifying catalyst according to claim 1, wherein the specific element contained in the first catalyst layer is palladium.

6. The exhaust gas purifying catalyst according to claim 1, wherein a second catalyst layer is further provided on a surface of the first catalyst layer.

7. The exhaust gas purifying catalyst according to claim 6, wherein the specific element contained in the first catalyst layer is palladium, and
the second catalyst layer contains rhodium.

* * * * *